US012811801B2

(12) United States Patent
Pagani et al.

(10) Patent No.: US 12,811,801 B2
(45) Date of Patent: Nov. 24, 2026

(54) FILTERING BLOCKCHAIN TRANSACTIONS

(71) Applicant: nChain Licensing AG, Zug (CH)

(72) Inventors: Alessio Pagani, London (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 863 days.

(21) Appl. No.: 17/926,540

(22) PCT Filed: Apr. 23, 2021

(86) PCT No.: PCT/EP2021/060745
§ 371 (c)(1),
(2) Date: Nov. 18, 2022

(87) PCT Pub. No.: WO2021/239354
PCT Pub. Date: Dec. 2, 2021

(65) Prior Publication Data

US 2025/0240171 A1 Jul. 24, 2025

(30) Foreign Application Priority Data

May 28, 2020 (GB) ...................................... 2007995

(51) Int. Cl.
*H04L 9/32* (2006.01)

(52) U.S. Cl.
CPC .......... *H04L 9/3247* (2013.01); *H04L 9/3236* (2013.01)

(58) Field of Classification Search
CPC ....... H04L 9/3247; H04L 9/3236; H04L 9/50; H04L 9/3239; H04L 2209/56;
(Continued)

(56) References Cited

U.S. PATENT DOCUMENTS 11,244,316 B2 * 2/2022 Darnell ............ G06Q 20/38215
11,573,976 B2 * 2/2023 Sharma ................ G06Q 20/382
(Continued)

FOREIGN PATENT DOCUMENTS

JP 2019145925 A 8/2019
WO 2019163040 A1 8/2019

OTHER PUBLICATIONS

Andreas A, Bitcoin and Blockchain, First Edition, NTT Publishing Co., Ltd., Toshiharu Hasebe, Jul. 21, 2016, pp. 160 to 161.
(Continued)

*Primary Examiner* — Azizul Choudhury
(74) *Attorney, Agent, or Firm* — Rowan P. Smith; Galvani Smith PLLC

(57) ABSTRACT

A computer-implemented method of processing a blockchain transaction, wherein the method is performed by a receiving party and comprises: obtaining one or more probabilistic filters, wherein each probabilistic filter encodes one of i) one or more sets of whitelisted data items, or ii) one or more sets of blacklisted data items; obtaining a blockchain transaction, wherein the obtained blockchain transaction is associated with a candidate data item corresponding to i) one of the one or more sets of whitelisted data items, or ii) one on the one or more sets of blacklisted data items; and
(Continued)

determining whether to process the obtained blockchain transaction based on whether the candidate data item is present in at least one of the one or more probabilistic filters.

20 Claims, 7 Drawing Sheets

(58) Field of Classification Search
CPC .... G06Q 20/382; G06Q 20/065; G06Q 20/36; G06F 16/2462
See application file for complete search history.

(56) References Cited

U.S. PATENT DOCUMENTS

| | | | | |
|---|---|---|---|---|
| 12,271,898 | B1 * | 4/2025 | Arvanaghi | G06Q 20/10 |
| 2019/0303888 | A1 * | 10/2019 | Hamasni | G06Q 20/027 |
| 2019/0349190 | A1 * | 11/2019 | Smith | H04W 84/22 |
| 2019/0349733 | A1 * | 11/2019 | Nolan | H04L 45/20 |
| 2020/0014531 | A1 * | 1/2020 | Falco | H04L 63/0884 |
| 2020/0193441 | A1 * | 6/2020 | Mokhasi | G06Q 20/4012 |
| 2021/0109920 | A1 * | 4/2021 | Kano | H04L 9/50 |
| 2021/0326308 | A1 * | 10/2021 | Wylie | G06F 16/176 |
| 2022/0101326 | A1 * | 3/2022 | Kim | G06Q 20/4016 |
| 2022/0327545 | A1 * | 10/2022 | Mokhasi | G06Q 20/4012 |

OTHER PUBLICATIONS

PCT/EP2021/060745 International Search Report and Written Opinion dated Sep. 3, 2021, 13 pages.
GB2007995.0 Combined Search and Abbreviated Examination Report dated Nov. 11, 2020, 7 pages.
Andreas M Antonopoulos: "Mastering Bitcoin", Jul. 21, 2017, XP055570487, ISBN: 978-1-4919-5438-6 Retrieved from the Internet: URL:https://www.oreilly.com/library/view/mastering-bitcoin-2nd/9781491954379/, [retrieved on Mar. 18, 2019], p. 189-191.
Bock Leon et al: "Assessing the Threat of Blockchain-based Botnets", 2019 APWG Symposium on Electronic Crime Research (ECRIME), IEEE, Nov. 13, 2019 (Nov. 13, 2019), pp. 1-11, XP033742304, DOI: 10.1109/ECRIME47957.2019.9037600 [retrieved on Mar. 16, 2020] p. 4, right-hand column, paragraph 3.
Neudecker Till et al: "Network Layer Aspects of Permissionless Blockchains", IEEE Communications Surveys & Tutorials, vol. 21, No. 1, Feb. 21, 2019 (Feb. 21, 2019), pp. 838-857, XP011711813,DOI: 10.1109/COMST.2018.2852480 [retrieved on Feb. 21, 2019] p. 9, right-hand column, paragraph 4.

* cited by examiner

FILTERING BLOCKCHAIN TRANSACTIONS

CROSS REFERENCE TO RELATED APPLICATIONS

This application is the U.S. National Stage of International Application No. PCT/EP2021/060745 filed on Apr. 23, 2021, which claims the benefit of United Kingdom Patent Application No. 2007995.0, filed on May 28, 2020, the contents of which are incorporated herein by reference in their entireties.

TECHNICAL FIELD

The present disclosure relates to a method of processing blockchain transactions.

BACKGROUND

A blockchain refers to a form of distributed data structure, wherein a duplicate copy of the blockchain is maintained at each of a plurality of nodes in a distributed peer-to-peer (P2P) network (referred to below as a "blockchain network") and widely publicised. The blockchain comprises a chain of blocks of data, wherein each block comprises one or more transactions. Each transaction, other than so-called "coinbase transactions", points back to a preceding transaction in a sequence which may span one or more blocks up until one or more coinbase transactions. Coinbase transactions are discussed below. Transactions that are submitted to the blockchain network are included in new blocks. New blocks are created by a process often referred to as "mining", which involves each of a plurality of the nodes competing to perform "proof-of-work", i.e. solving a cryptographic puzzle based on a representation of a defined set of ordered and validated pending transactions waiting to be included in a new block of the blockchain. It should be noted that the blockchain may be pruned at a node, and the publication of blocks can be achieved through the publication of mere block headers.

The transactions in the blockchain are used to perform one or more of the following: to convey a digital asset (i.e. a number of digital tokens), to order a set of journal entries in a virtualised ledger or registry, to receive and process timestamp entries, and/or to time-order index pointers. A blockchain can also be exploited in order to layer additional functionality on top of the blockchain. Blockchain protocols may allow for storage of additional user data or indexes to data in a transaction. There is no pre-specified limit to the maximum data capacity that can be stored within a single transaction, and therefore increasingly more complex data can be incorporated. For instance this may be used to store an electronic document in the blockchain, or audio or video data.

Nodes of the blockchain network (which are often referred to as "miners") perform a distributed transaction registration and verification process, which will be described in detail below. In summary, during this process a node validates transactions and inserts them into a block template for which they attempt to identify a valid proof-of-work solution. Once a valid solution is found, a new block is propagated to other nodes of the network, thus enabling each node to record the new block on the blockchain. In order to have a transaction recorded in the blockchain, a user (e.g. a blockchain client application) sends the transaction to one of the nodes of the network to be propagated. Nodes which receive the transaction may race to find a proof-of-work solution incorporating the validated transaction into a new block. Each node is configured to enforce the same node protocol, which will include one or more conditions for a transaction to be valid. Invalid transactions will not be propagated nor incorporated into blocks. Assuming the transaction is validated and thereby accepted onto the blockchain, then the transaction (including any user data) will thus remain registered and indexed at each of the nodes in the blockchain network as an immutable public record.

The node who successfully solved the proof-of-work puzzle to create the latest block is typically rewarded with a new transaction called the "coinbase transaction" which distributes an amount of the digital asset, i.e. a number of tokens. The detection and rejection of invalid transactions is enforced by the actions of competing nodes who act as agents of the network and are incentivised to report and block malfeasance. The widespread publication of information allows users to continuously audit the performance of nodes. The publication of the mere block headers allows participants to ensure the ongoing integrity of the blockchain.

In an "output-based" model (sometimes referred to as a UTXO-based model), the data structure of a given transaction comprises one or more inputs and one or more outputs. Any spendable output comprises an element specifying an amount of the digital asset that is derivable from the proceeding sequence of transactions. The spendable output is sometimes referred to as a UTXO ("unspent transaction output"). The output may further comprise a locking script specifying a condition for the future redemption of the output. A locking script is a predicate defining the conditions necessary to validate and transfer digital tokens or assets. Each input of a transaction (other than a coinbase transaction) comprises a pointer (i.e. a reference) to such an output in a preceding transaction, and may further comprise an unlocking script for unlocking the locking script of the pointed-to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the blockchain network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it (as a valid transaction, but possibly to register an invalid transaction) nor include it in a new block to be recorded in the blockchain.

An alternative type of transaction model is an account-based model. In this case each transaction does not define the amount to be transferred by referring back to the UTXO of a preceding transaction in a sequence of past transactions, but rather by reference to an absolute account balance. The current state of all accounts is stored by the nodes separate to the blockchain and is updated constantly.

SUMMARY

Tracking and seizing digital assets (e.g. tokens) on a blockchain can be a convoluted process and in the past criminals have taken advantage of this complexity to use the blockchain for illicit activities, e.g. to settle illegal deals. Some blockchain networks are working proactively to reduce the usage of the blockchain for criminal activities, improving transparency and protecting users and businesses. An effort to reach these goals is in the identification and banning of malevolent users and the seizure of their digital assets.

There is therefore a need to be able to identify and ban or prevent transactions that are known or suspected of being associated with criminals, have been involved in illicit activity, or contain illegal content. Nodes of the network could then freeze these transactions, i.e. prevent the outputs of those transactions from being assigned (e.g. spent), thus rendering those outputs worthless to the current owner. Nodes of the network could also refuse to serve those transactions, e.g. refuse to make some or all of the transaction available to a requesting entity.

It would be equally desirable to identify transactions that are known to be "safe" transactions, e.g. to allow transaction outputs to be assigned to trusted entities.

More generally, it would be desirable to be able to whitelist or blacklist certain transactions or transaction content, or to prevent or allow transaction outputs to be assigned to specific entities.

According to one aspect disclosed herein, there is provided a computer-implemented method of processing a blockchain transaction, wherein the method is performed by a receiving party and comprises: obtaining one or more probabilistic filters, wherein each probabilistic filter encodes one of i) one or more sets of whitelisted data items, or ii) one or more sets of blacklisted data items; obtaining a blockchain transaction, wherein the obtained blockchain transaction is associated with a candidate data item corresponding to i) one of the one or more sets of whitelisted data items, or ii) one on the one or more sets of blacklisted data items; and determining whether to process the obtained blockchain transaction based on whether the candidate data item is present in at least one of the one or more probabilistic filters.

The present invention enables the first party (e.g. a user or a blockchain node) to process transactions based on a probabilistic membership test. The probabilistic filter either contains a set of whitelisted (i.e. allowed) items, or a set of blacklisted (i.e. banned) items. A probabilistic filter (e.g. a Bloom filter or Cuckoo filter) is a probabilistic data structure that is used to test whether an element is a member of a set. A characteristic of probabilistic filters is that false positives are possible, but false negatives are not. That is, a probabilistic filter can be used to determine whether an element is definitely not in the set, or whether an element may be in the set. By obtaining the probabilistic filter(s), the first party can check whether a data item associated with the transaction is either definitely not allowable (for whitelisted items), or definitely not banned (for blacklisted items).

For instance, the whitelisted items or backlisted items may be allowable or banned destination addresses respectively. The first party (e.g. a user operating a client application) may therefore choose to assign an amount of digital asset based on whether the destination address is deemed to be allowable or banned. The items may instead be allowable or banned transaction identifiers. In those examples, the first party (e.g. a blockchain node) may choose whether to serve a transaction based on whether the corresponding transaction identifier is deemed to be allowable or banned. Further examples are provided below.

The whitelisted items may be items that a second party (e.g. a trusted authority) has deemed to be allowable for one or more reasons. Similarly, the blacklisted items may be items that the second party has deemed to be banned for one or more reasons, e.g. due to being associated with criminal activity.

The present invention improves the security of users and/or nodes by preventing those users and/or nodes from unintentionally associating themselves with illicit content or the like. For example, a blockchain node can perform a membership test to check that the node is not storing or propagating transactions containing illegal material.

The probabilistic filters (e.g. comprising a reference to outputs used as part of criminal or fraudulent activity) may be provided by national or international courts. This allows those courts to freeze those outputs and to block illegal on-chain content in their jurisdictions. On one hand, criminals are therefore disincentivized to trade illegal goods and to receive fraudulent transactions, as they would not be able to assign them. On the other hand, transactions between legitimate entities (e.g. users and businesses) are incentivized as they can be confident of the legitimacy of the chain of transactions leading to the UTXOs being assigned to or from those entities.

Note that it is also desirable to prevent transactions from being served other than for legal reasons. As an example, a user's personal data may have been stored on the blockchain, with or without their permission. That user may wish to prevent their data from being sent to requesting entities.

According to another aspect disclosed herein, there is provided a computer-implemented method of controlling access to some or all of a blockchain transaction, wherein the method is performed by a transmitting party and comprises: generating one or more probabilistic filters, wherein each probabilistic filter encodes one of i) one or more sets of whitelisted data items, or ii) one or more sets of blacklisted data items; and transmitting the one or more probabilistic filters to a receiving party.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Example System Overview

Figure 1:
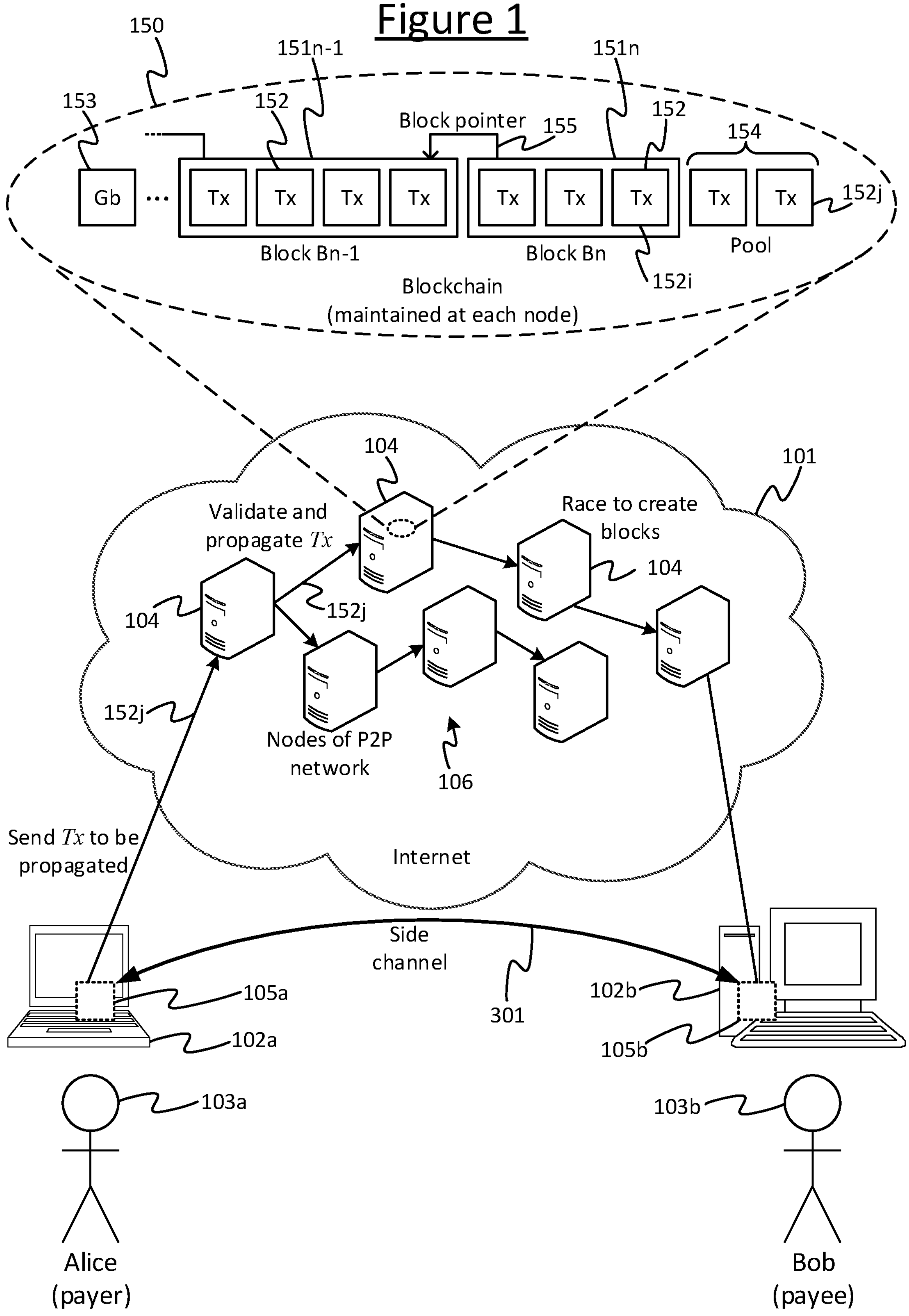
FIG. 1 is a schematic block diagram of a system for implementing a blockchain, FIG. 2 schematically illustrates some examples of transactions which may be recorded in a blockchain.

FIG. 1 shows an example system 100 for implementing a blockchain 150. The system 100 may comprise of a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 comprises computer equipment of a peer, with different ones of the nodes 104 belonging to different peers. Each blockchain node 104 comprises processing apparatus comprising one or more processors, e.g. one or more central processing units (CPUs), accelerator processors, application specific processors and/or field programmable gate arrays (FPGAs), and other equipment such as Application Specific Integrated Circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 160. As mentioned above, maintaining a copy of the blockchain 150 does not necessarily mean storing the blockchain 150 in full. Instead, the blockchain 150 may be pruned of data so long as each blockchain node 150 stores the blockheader (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered set 154 of transactions 152 waiting to be incorporated into blocks 151. The ordered set 154 is often referred to as a "mempool". This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction 152*j*, the (or each) input comprises a pointer referencing the output of a preceding transaction 152*i* in the sequence of transactions, specifying that this output is to be redeemed or "spent" in the present transaction 152*j*. In general, the preceding transaction could be any transaction in the ordered set 154 or any block 151. The preceding transaction 152*i* need not necessarily exist at the time the present transaction 152*j* is created or even sent to the network 106, though the preceding transaction 152*i* will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152*i*, 152*j* be created or sent out-of-order (see discussion below on orphan transactions). The preceding transaction 152*i* could equally be called the antecedent or predecessor transaction.

The input of the present transaction 152*j* also comprises the input authorisation, for example the signature of the user 103*a* to whom the output of the preceding transaction 152*i* is locked. In turn, the output of the present transaction 152*j* can be cryptographically locked to a new user or entity 103*b*. The present transaction 152*j* can thus transfer the amount defined in the input of the preceding transaction 152*i* to the new user or entity 103*b* as defined in the output of the present transaction 152*j*. In some cases a transaction 152 may have multiple outputs to split the input amount between multiple users or entities (one of whom could be the original user or entity 103*a* in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when an entity, such as a user or machine, 103 wishes to enact a new transaction 152*j*, then the entity sends the new transaction from its computer terminal 102 to a recipient. The entity or the recipient will eventually send this transaction to one or more of the blockchain nodes 104 of the network 106 (which nowadays are typically servers or data centres, but could in principle be other user terminals). It is also not excluded that the entity 103 enacting the new transaction 152*j* could send the transaction to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typically requires the blockchain node 104 to check that a cryptographic signature in the new transaction 152*j* matches the expected signature, which depends on the previous transaction 152*i* in an ordered sequence of transactions 152. In such an output-based transaction protocol, this may comprise checking that the cryptographic signature or other authorisation of the entity 103 included in the input of the new transaction 152*j* matches a condition defined in the output of the preceding transaction 152*i* which the new transaction assigns, wherein this condition typically comprises at least checking that the cryptographic signature or other authorisation in the input of the new transaction 152*j* unlocks the output of the previous transaction 152*i* to which the input of the new transaction is linked to. The condition may be at least partially defined by a script included in the output of the preceding transaction 152*i*. Alternatively it could simply be fixed by the blockchain node protocol alone, or it could be due to a combination of these. Either way, if the new transaction 152*j* is valid, the blockchain node 104 forwards it to one or more other blockchain nodes 104 in the blockchain network 106. These other blockchain nodes 104 apply the same test according to the same blockchain node protocol, and so forward the new transaction 152*j* on to one or more further nodes 104, and so forth. In this way the new transaction is propagated throughout the network of blockchain nodes 104.

In an output-based model, the definition of whether a given output (e.g. UTXO) is assigned is whether it has yet been validly redeemed by the input of another, onward transaction 152*j* according to the blockchain node protocol. Another condition for a transaction to be valid is that the output of the preceding transaction 152*i* which it attempts to assign or redeem has not already been assigned/redeemed by another transaction. Again if not valid, the transaction 152*j* will not be propagated (unless flagged as invalid and propagated for alerting) or recorded in the blockchain 150. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered set 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered set of transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block 151*n* pointing back to the previously created block 151*n*−1 in the chain. A significant amount of effort, for example in the form of hash, required to create a proof-of-work solution signals the intent of the first node 104 to follow the rules of the blockchain protocol. Such rules include not accepting a transaction as valid if it assigns the same output as a previously validated transaction, otherwise known as double-spending. Once created, the block 151 cannot be modified since it is recognized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106, this therefore provides an immutable public ledger of the transactions.

Note that different blockchain nodes 104 racing to solve the puzzle at any given time may be doing so based on different snapshots of the ordered set of yet to be published transactions 154 at any given time, depending on when they started searching for a solution or the order in which the transactions were received. Whoever solves their respective puzzle first defines which transactions 152 are included in the next new block 151*n* and in which order, and the current set 154 of unpublished transactions is updated. The blockchain nodes 104 then continue to race to create a block from the newly defined outstanding ordered set of unpublished transactions 154, and so forth. A protocol also exists for resolving any "fork" that may arise, which is where two blockchain nodes 104 solve their puzzle within a very short time of one another such that a conflicting view of the blockchain gets propagated between nodes 104. In short, whichever prong of the fork grows the longest becomes the definitive blockchain 150. Note this should not affect the users or agents of the network as the same transactions will appear in both forks.

According to the bitcoin blockchain (and most other blockchains) a node that successfully constructs a new block 104 is granted the ability to assign an accepted amount of the digital asset in a new special kind of transaction which distributes a defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction". It typically forms the first transaction of the new block 151*n*. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151*n* in which that transaction was published. This fee is normally referred to as the "transaction fee", and is discussed blow.

Due to the resources involved in transaction validation and publication, typically at least each of the blockchain nodes 104 takes the form of a server comprising one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users. These users may interact with the blockchain network but do not participate in validating, constructing or propagating transactions and blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as "clients") may be said to be part of a system that includes the blockchain network; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party 103*a* and his/her respective computer equipment 102*a*, and a second party 103*b* and his/her respective computer equipment 102*b*. It will be understood that many more such parties 103 and their respective computer equipment 102 may be present and participating in the system 100, but for convenience they are not illustrated. Each party 103 may be an individual or an organization. Purely by way of illustration the first party 103*a* is referred to herein as Alice and the second party 103*b* is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective party 103 to create, authorise (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction 152*j* to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g. this could be the blockchain node 104 that is best connected to Alice's computer 102. When any given blockchain node 104 receives a new transaction 152*j*, it handles it in accordance with the blockchain node protocol and its respective role. This comprises first checking whether the newly received transaction 152*j* meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction **152*j* passes the test for being deemed valid (i.e. on condition that it is "validated"), any blockchain node 104 that receives the transaction 152*j* will add the new validated transaction 152 to the ordered set of transactions 154 maintained at that blockchain node 104. Further, any blockchain node 104 that receives the transaction 152*j* will propagate the validated transaction 152 onward to one or more other blockchain nodes 104 in the network 106. Since each blockchain node 104 applies the same protocol, then assuming the transaction 152*j* is valid, this means it will soon be propagated throughout the whole network 106**.

Once admitted to the ordered set of transactions 154 maintained at a given blockchain node 104, that blockchain node 104 will start competing to solve the proof-of-work puzzle on the latest version of their respective ordered set of transactions 154 including the new transaction 152 (recall that other blockchain nodes 104 may be trying to solve the puzzle based on a different ordered set of transactions 154, but whoever gets there first will define the ordered set of transactions that are included in the latest block 151. Eventually a blockchain node 104 will solve the puzzle for a part of the ordered set 154 which includes Alice's transaction **152*j*). Once the proof-of-work has been done for the ordered set 154 including the new transaction 152*j*, it immutably becomes part of one of the blocks 151 in the blockchain 150. Each transaction 152** comprises a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

UTXO-Based Model

Figure 2:
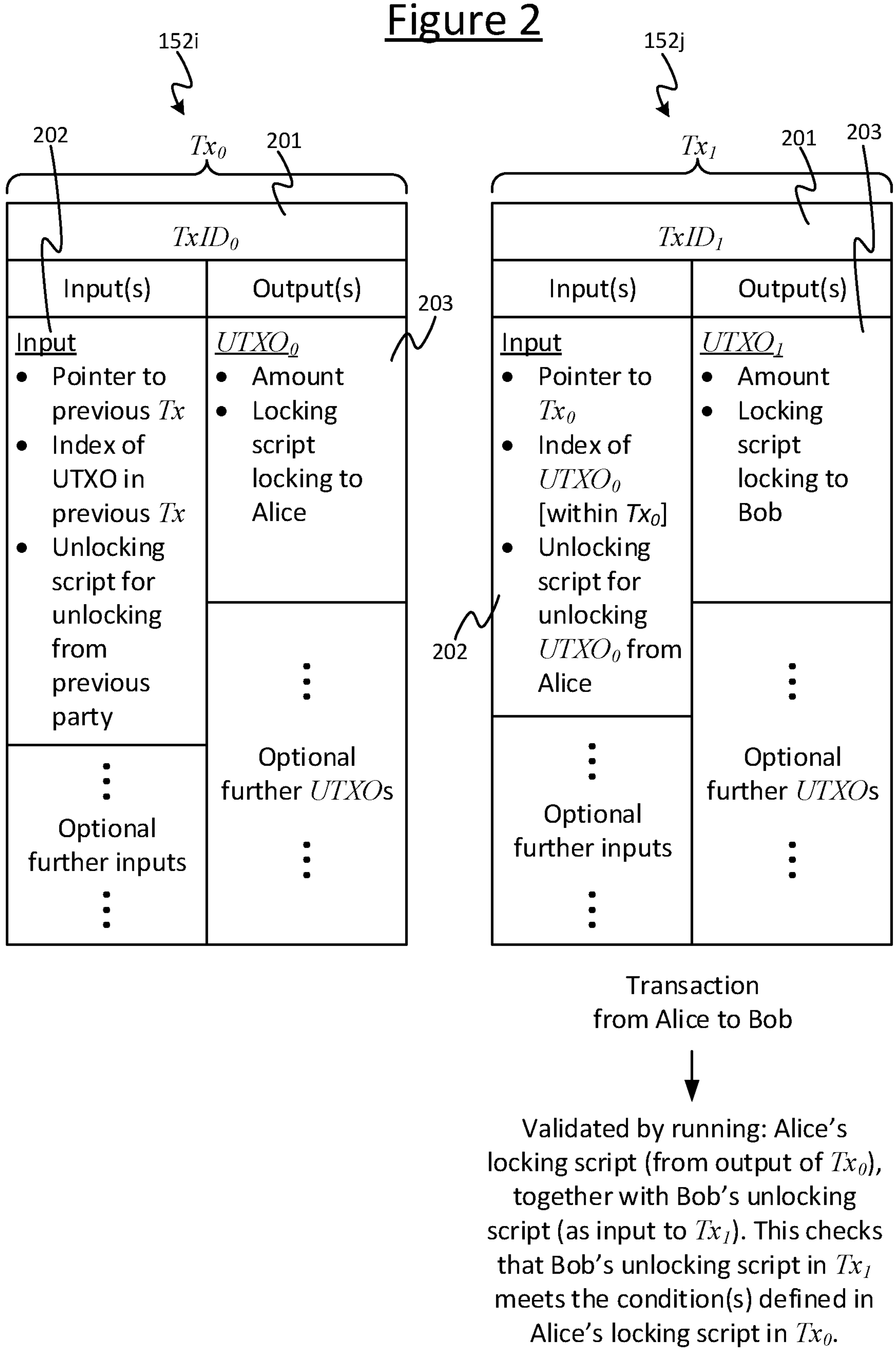

FIG. 2 illustrates an example transaction protocol. This is an example of a UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this is not limiting to all possible embodiments. Note that while the example UTXO-based protocol is described with reference to bitcoin, it may equally be implemented on other example blockchain networks.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the nodes 104.

Say Alice **103*a* wishes to create a transaction 152*j* transferring an amount of the digital asset in question to Bob 103*b*. In FIG. 2 Alice's new transaction 152*j* is labelled "$Tx_1$". It takes an amount of the digital asset that is locked to Alice in the output 203 of a preceding transaction 152*i* in the sequence, and transfers at least some of this to Bob. The preceding transaction 152*i* is labelled "$Tx_0$" in FIG. 2. $Tx_0$ and $Tx_1$ are just arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203** locked to Alice.

The preceding transaction $Tx_0$ may already have been validated and included in a block 151 of the blockchain 150 at the time when Alice creates her new transaction $Tx_1$, or at least by the time she sends it to the network 106. It may already have been included in one of the blocks 151 at that time, or it may be still waiting in the ordered set 154 in which case it will soon be included in a new block 151. Alternatively $Tx_0$ and $Tx_1$ could be created and sent to the network 106 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains a representation (i.e. a hash) of the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction $Tx_1$ arrives at a blockchain node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$><$P_A$>||[Checksig $P_A$]

where "||" represents a concatenation and "< . . . >" means place the data on the stack, and "[ . . . ]" is a function comprised by the locking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the unlocking script in the input of $Tx_1$ contains the signature of Alice signing the expected portion of data. The expected portion of data itself (the "message") also needs to be included in order to perform this authentication. In embodiments the signed data comprises the whole of $Tx_1$ (so a separate element does not need to be included specifying the signed portion of data in the clear, as it is already inherently present).

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically comprises hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the blockchain node 104 deems $Tx_1$ valid. This means that the blockchain node 104 will add $Tx_1$ to the ordered set of transactions 154. The blockchain node 104 will also forward the transaction $Tx_1$ to one or more other blockchain nodes 104 in the network 106, so that it will be propagated throughout the network 106. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the blockchain node 104 also needs to check whether the referenced UTXO in the preceding transaction $Tx_0$ is already spent (i.e. whether it has already formed a valid input to another valid transaction). This is one reason why it is important for the blockchain 150 to impose a defined order on the transactions 152. In practice a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the bitcoin node that publishes her transaction 104. If Alice does not include such a fee, $Tx_0$ may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction.

E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference may be assigned by the node 104 that publishes the block containing $UTXO_1$. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e. not using the exact language). For example, one may use operation codes (opcodes) to represent a particular function. "OP_. . . . " refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. E.g. the data could comprise a document which it is desired to store in the blockchain.

Typically an input of a transaction contains a digital signature corresponding to a public key $P_A$. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The locking script is sometimes called "scriptPubKey" referring to the fact that it typically comprises the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

As shown in FIG. 1, the client application on each of Alice and Bob's computer equipment 102*a*, 120*b*, respectively, may comprise additional communication functionality. This additional functionality enables Alice 103*a* to establish a separate side channel 107 with Bob 103*b* (at the instigation of either party or a third party). The side channel 107 enables exchange of data separately from the blockchain network. Such communication is sometimes referred to as "off-chain" communication. For instance this may be used to exchange a transaction 152 between Alice and Bob without the transaction (yet) being registered onto the blockchain network 106 or making its way onto the chain 150, until one of the parties chooses to broadcast it to the network 106. Sharing a transaction in this way is sometimes referred to as sharing a "transaction template". A transaction template may lack one or more inputs and/or outputs that are required in order to form a complete transaction. Alternatively or additionally, the side channel 107 may be used to exchange any other transaction related data, such as keys, negotiated amounts or terms, data content, etc.

The side channel 107 may be established via the same packet-switched network 101 as the blockchain network 106. Alternatively or additionally, the side channel 107 may be established via a different network such as a mobile cellular network, or a local area network such as a local wireless network, or even a direct wired or wireless link between Alice and Bob's devices 102*a*, 102*b*. Generally, the side channel 107 as referred to anywhere herein may comprise any one or more links via one or more networking technologies or communication media for exchanging data "off-chain", i.e. separately from the blockchain network 106. Where more than one link is used, then the bundle or collection of off-chain links as a whole may be referred to as the side channel 107. Note therefore that if it is said that Alice and Bob exchange certain pieces of information or data, or such like, over the side channel 107, then this does not necessarily imply all these pieces of data have to be send over exactly the same link or even the same type of network.

Client Software

Figure 3A:
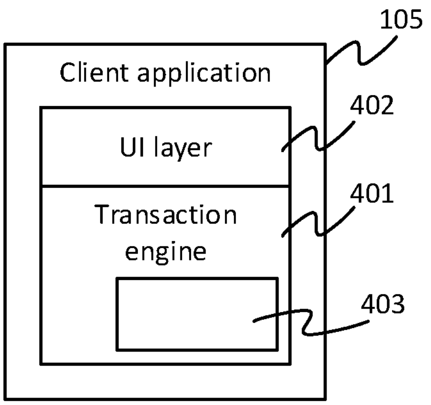
FIG. 3A is a schematic block diagram of a client application.

FIG. 3A illustrates an example implementation of the client application 105 for implementing embodiments of the presently disclosed scheme. The client application 105 comprises a transaction engine 401 and a user interface (UI) layer 402. The transaction engine 401 is configured to implement the underlying transaction-related functionality of the client 105, such as to formulate transactions 152, receive and/or send transactions and/or other data over the side channel 107, and/or send transactions to one or more nodes 104 to be propagated through the blockchain network 106, in accordance with the schemes discussed above and as discussed in further detail shortly.

The UI layer 402 is configured to render a user interface via a user input/output (I/O) means of the respective user's computer equipment 102, including outputting information to the respective user 103 via a user output means of the equipment 102, and receiving inputs back from the respective user 103 via a user input means of the equipment 102. For example the user output means could comprise one or more display screens (touch or non-touch screen) for providing a visual output, one or more speakers for providing an audio output, and/or one or more haptic output devices for providing a tactile output, etc. The user input means could comprise for example the input array of one or more touch screens (the same or different as that/those used for the output means); one or more cursor-based devices such as mouse, trackpad or trackball; one or more microphones and speech or voice recognition algorithms for receiving a speech or vocal input; one or more gesture-based input devices for receiving the input in the form of manual or bodily gestures; or one or more mechanical buttons, switches or joysticks, etc.

Note: whilst the various functionality herein may be described as being integrated into the same client application 105, this is not necessarily limiting and instead they could be implemented in a suite of two or more distinct applications, e.g. one being a plug-in to the other or interfacing via an API (application programming interface). For instance, the functionality of the transaction engine 401 may be implemented in a separate application than the UI layer 402, or the functionality of a given module such as the transaction engine 401 could be split between more than one application. Nor is it excluded that some or all of the described functionality could be implemented at, say, the operating system layer. Where reference is made anywhere herein to a single or given application 105, or such like, it will be appreciated that this is just by way of example, and more generally the described functionality could be implemented in any form of software.

Figure 3B:
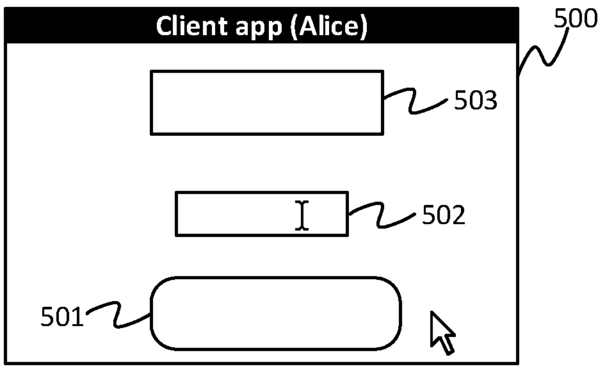
FIG. 3B is a schematic mock-up of an example user interface that may be presented by the client application of FIG. 3A.

FIG. 3B gives a mock-up of an example of the user interface (UI) 500 which may be rendered by the UI layer 402 of the client application 105*a* on Alice's equipment 102*a*. It will be appreciated that a similar UI may be rendered by the client 105*b* on Bob's equipment 102*b*, or that of any other party.

By way of illustration FIG. 3B shows the UI 500 from Alice's perspective. The UI 500 may comprise one or more UI elements 501, 502, 502 rendered as distinct UI elements via the user output means.

For example, the UI elements may comprise one or more user-selectable elements 501 which may be, such as different on-screen buttons, or different options in a menu, or such like. The user input means is arranged to enable the user 103 (in this case Alice 103*a*) to select or otherwise operate one of the options, such as by clicking or touching the UI element on-screen, or speaking a name of the desired option (N.B. the term "manual" as used herein is meant only to contrast against automatic, and does not necessarily limit to the use of the hand or hands). The options enable the user (Alice) to add items (e.g. blockchain address) to a probabilistic filter.

Alternatively or additionally, the UI elements may comprise one or more data entry fields 502, through which the user can add items (e.g. blockchain address) to a probabilistic filter. These data entry fields are rendered via the user output means, e.g. on-screen, and the data can be entered into the fields through the user input means, e.g. a keyboard or touchscreen. Alternatively the data could be received orally for example based on speech recognition.

Alternatively or additionally, the UI elements may comprise one or more information elements 503 output to output information to the user. E.g. this/these could be rendered on screen or audibly.

It will be appreciated that the particular means of rendering the various UI elements, selecting the options and entering data is not material. The functionality of these UI elements will be discussed in more detail shortly. It will also be appreciated that the UI 500 shown in FIG. 3 is only a schematized mock-up and in practice it may comprise one or more further UI elements, which for conciseness are not illustrated.

Node Software

Figure 4:
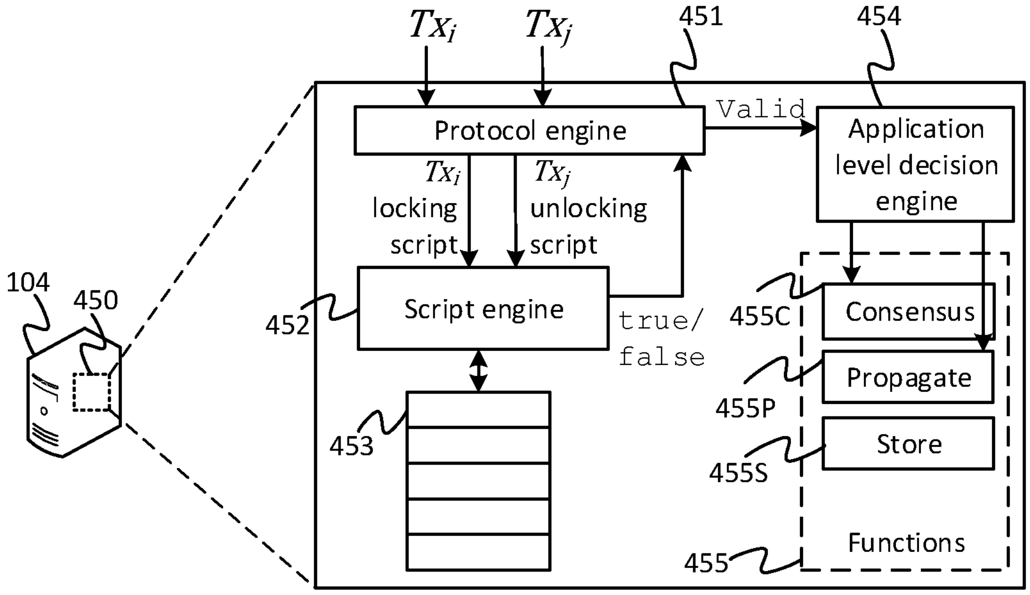
FIG. 4 is a schematic block diagram of some node software for processing transactions.

FIG. 4 illustrates an example of the node software 450 that is run on each blockchain node 104 of the network 106, in the example of a UTXO- or output-based model. Note that another entity may run node software 450 without being classed as a node 104 on the network 106, i.e. without performing the actions required of a node 104. The node software 450 may contain, but is not limited to, a protocol engine 451, a script engine 452, a stack 453, an application-level decision engine 454, and a set of one or more blockchain-related functional modules 455. Each node 104 may run node software that contains, but is not limited to, all three of: a consensus module 455C (for example, proof-of-work), a propagation module 455P and a storage module 455S (for example, a database). The protocol engine 401 is typically configured to recognize the different fields of a transaction 152 and process them in accordance with the node protocol. When a transaction 152*j* ($Tx_j$) is received having an input pointing to an output (e.g. UTXO) of another, preceding transaction 152*i* ($Tx_{m-1}$), then the protocol engine 451 identifies the unlocking script in $Tx_j$ and passes it to the script engine 452. The protocol engine 451 also identifies and retrieves $Tx_i$ based on the pointer in the input of $Tx_j$. $Tx_i$ may be published on the blockchain 150, in which case the protocol engine may retrieve $Tx_j$ from a copy of a block 151 of the blockchain 150 stored at the node 104. Alternatively, $Tx_i$ may yet to have been published on the blockchain 150. In that case, the protocol engine 451 may retrieve Tx from the ordered set 154 of unpublished transactions maintained by the node 104. Either way, the script engine 451 identifies the locking script in the referenced output of $Tx_i$ and passes this to the script engine 452.

The script engine 452 thus has the locking script of $Tx_i$ and the unlocking script from the corresponding input of $Tx_j$. For example, transactions labelled $Tx_0$ and $Tx_1$ are illustrated in FIG. 2, but the same could apply for any pair of transactions. The script engine 452 runs the two scripts together as discussed previously, which will include placing data onto and retrieving data from the stack 453 in accordance with the stack-based scripting language being used (e.g. Script).

By running the scripts together, the script engine 452 determines whether or not the unlocking script meets the one or more criteria defined in the locking script—i.e. does it "unlock" the output in which the locking script is included? The script engine 452 returns a result of this determination to the protocol engine 451. If the script engine 452 determines that the unlocking script does meet the one or more criteria specified in the corresponding locking script, then it returns the result "true". Otherwise it returns the result "false".

In an output-based model, the result "true" from the script engine 452 is one of the conditions for validity of the transaction. Typically there are also one or more further, protocol-level conditions evaluated by the protocol engine 451 that must be met as well; such as that the total amount of digital asset specified in the output(s) of $Tx_j$ does not exceed the total amount pointed to by its inputs, and that the pointed-to output of $Tx_i$ has not already been spent by another valid transaction. The protocol engine 451 evaluates the result from the script engine 452 together with the one or more protocol-level conditions, and only if they are all true does it validate the transaction $Tx_j$. The protocol engine 451 outputs an indication of whether the transaction is valid to the application-level decision engine 454. Only on condition that $Tx_j$ is indeed validated, the decision engine 454 may select to control both of the consensus module 455C and the propagation module 455P to perform their respective blockchain-related function in respect of $Tx_j$. This comprises the consensus module 455C adding $Tx_j$ to the node's respective ordered set of transactions 154 for incorporating in a block 151, and the propagation module 455P forwarding $Tx_j$ to another blockchain node 104 in the network 106. Optionally, in embodiments the application-level decision engine 454 may apply one or more additional conditions before triggering either or both of these functions. E.g. the decision engine may only select to publish the transaction on condition that the transaction is both valid and leaves enough of a transaction fee.

Note also that the terms "true" and "false" herein do not necessarily limit to returning a result represented in the form of only a single binary digit (bit), though that is certainly one possible implementation. More generally, "true" can refer to any state indicative of a successful or affirmative outcome, and "false" can refer to any state indicative of an unsuccessful or non-affirmative outcome. For instance in an account-based model, a result of "true" could be indicated by a combination of an implicit, protocol-level validation of a signature and an additional affirmative output of a smart contract (the overall result being deemed to signal true if both individual outcomes are true).

Preliminaries

Probabilistic filters are memory efficient data structures used to test whether an element is part of a set. False negatives are never possible, meaning that if an item is added to a probabilistic filter then the filter will always be able tell if the same item is presented again. However, false positives are possible, with a false positive probability that depends on several factors (e.g. the size of the probabilistic filter). In other words, there is a trade-off between the space-efficiency of the filter and the false positive probability.

The two most widely used probabilistic filters are Bloom filters and Cuckoo filters. Both filters are initialized providing a target false positive probability (fpp) and an expected number of elements. One fundamental difference between these two filters is that Bloom filters can accommodate any number of elements, but when the number of elements inserted is higher than the number of expected elements the false positive probability of the filter increases (up to 100%). Conversely, Cuckoo filters maintain the target false positive rate, but the insertion of new elements after the expected number is not guaranteed (insertion may be rejected). That is, the maximum size of the filter is not flexible after creation and in order to accommodate additional elements beyond the maximum number, a new filter must be created. Another difference between these two filters is that Cuckoo filters allow deletion of previously inserted elements, while this is not possible in Bloom filters. Note that Bloom and Cuckoo are just two types of probabilistic filters and the present invention is not limited to just these two examples.

The space efficiency of each of the two filters is similar: the cost, in bits per element, for a Bloom filter is $$1.44 * \log_2 \frac{1}{fpp}$$

while for a Cuckoo filter is $$\frac{\log_2 \frac{1}{fpp} + 2}{\text{load}},$$

where load is the filter load (usually between 90 and 95%).

Cuckoo filters are more time-efficient, performing insertions, deletions and lookup in O(1), where the notation O( ) represents the complexity of the algorithm. O(1) represents a constant complexity and a fast algorithm, whereas O(k) represents a complexity that increases with k and a slower algorithm. Bloom filters perform the same operations, except deletion that is not supported, in O(k) where k is the number of hash functions of the Bloom filter.

Filtering Blockchain Transactions

The present invention enables effective blacklisting of blockchain transactions, (e.g. those associated with criminal activities) or, conversely, whitelisting of blockchain transactions. The present invention is not necessarily limited to blacklisting or whitelisting a transaction in full, e.g. particular outputs, components or content of a transaction may be filtered. As used herein, blacklisting is an access control mechanism that filters explicitly mentioned elements (e.g., blockchain addresses), blocking them or preventing someone or something from accessing them. The opposite of blacklisting is whitelisting, an access control mechanism that allows one to access only specified elements.

The filtering of blockchain transactions as disclosed herein involves the creation of a probabilistic filter. The probabilistic filter is used to encode allowable data items (if the filter is for whitelisting) or to encode prohibited data items (if the filter is for blacklisting). The term "data item" when used in this context is taken to mean any item that is associated with a blockchain transaction. For instance, a data item may be a destination address (e.g. a public key or public key hash), a transaction identifier, an output, an output identifier (e.g. based on a transaction identifier and output index), a token, content included in a transaction or suitable for being included in a transaction, etc.

The list of data items that may be whitelisted or blacklisted may be large. Therefore in order to provide light storage and transmission (especially to lightweight wallets), these lists are compressed using probabilistic filters, which achieve up to 94% compression and provide fast lookup. The filters also increase privacy since they encode (i.e. represent) the data items rather than storing the actual data items.

Figure 5:
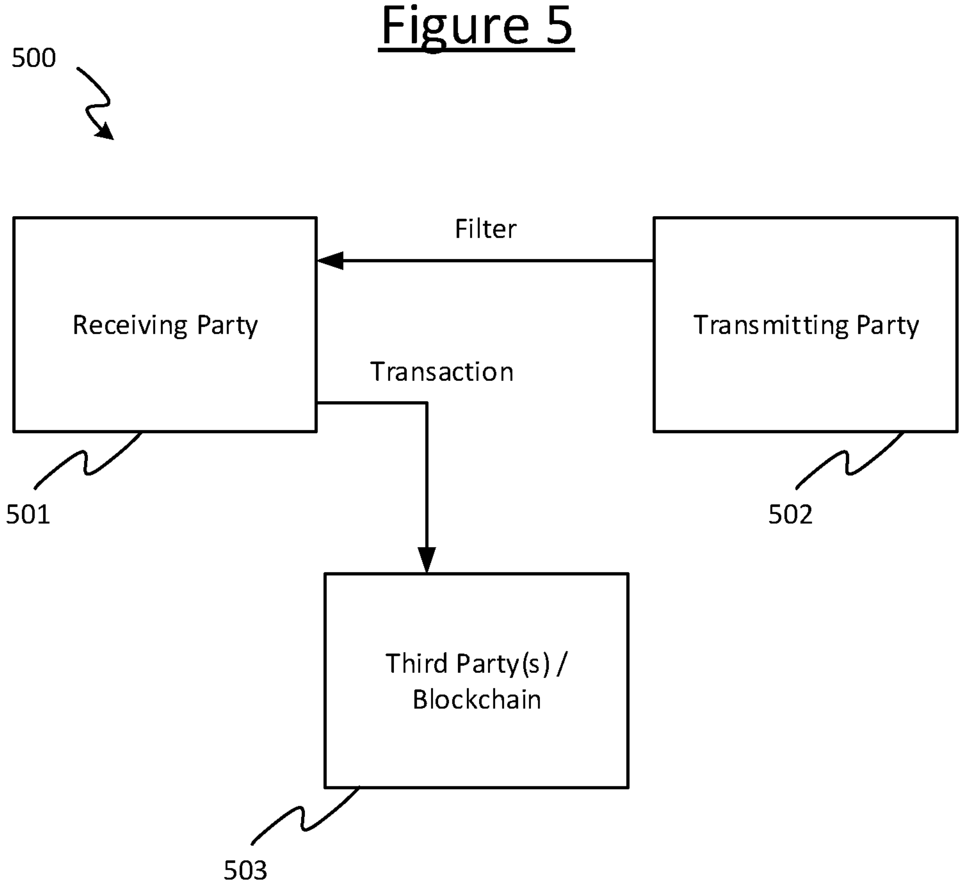
FIG. 5 is a schematic block diagram of a system for implementing embodiments of the present invention, FIGS. 6*a* and 6*b* schematically represent a membership test of a blacklist and whitelist respectively.

An example system 500 for implementing embodiments of the present invention is illustrated in FIG. 5. The system 500 comprises a receiving party 501 and a transmitting party 502. The system may comprise multiple different receiving parties 501 (not shown) and/or multiple different transmitting parties 502 (also not shown). The system may also comprise one or more third parties 503. As used herein, the term "transmitting party" 502 is used to refer to a party configured to generate and transmit a probabilistic filter to one or more receiving parties 502. Similarly, the term "receiving party" 502 is used to refer to a party configured to receive a probabilistic filter for the purpose of checking for membership, within the filter, of one or more data candidate items associated with a blockchain transaction. The role of the third party 503 will be discussed below.

Each receiving party 501, transmitting party 502 and third party 503 operates respective computer equipment (not shown). The respective computer equipment of each receiving party 501, transmitting party 502 and third party 503 comprises respective processing apparatus comprising one or more processors, e.g. one or more CPUs, GPUs, other accelerator processors, application specific processors, and/or FPGAs. The respective computer equipment of the receiving party 501, transmitting party 502 and third party 503 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the respective computer equipment stores software comprising a respective instance of at least one client application arranged to run on the processing apparatus. It will be understood that any action attributed herein to a given party may be performed using the software run on the processing apparatus of the respective computer equipment. The respective computer equipment of each of the receiving party 501, transmitting party 502 and third party 503 may comprises at least one user terminal, e.g. a desktop or laptop computer, a tablet, a smartphone, or a wearable device such as a smartwatch. The computer equipment of a given party may also comprise one or more other networked resources, such as cloud computing resources accessed via the user terminal.

In some examples, the receiving party 501 may comprise a user 103 (e.g. Alice 103*a* or Bob 103*b*) operating an instance of the client application 105 described above. In other examples, the receiving party 501 may comprise or otherwise operate a blockchain node 104.

In some examples, the transmitting party 502 may comprise a user 103 (e.g. Alice 103*a* or Bob 103*b*) operating an instance of the client application 105 described above. In other examples, the transmitting party 501 may comprise or otherwise operate a blockchain node 104. In other examples, the transmitting party 501 may be a trusted third party, e.g. a legal authority such as a national or international court, a certificate authority, a government department, a national or international police force, etc.

Note that whilst shown separately in FIG. 5, the receiving party 501 and transmitting party 802 may in fact be the same entity. That is, the receiving party 501 may generate the probabilistic filter.

In some examples, the third party 501 may comprise a user 103 (e.g. Alice 103*a* or Bob 103*b*) operating an instance of the client application 105, or a blockchain node 104.

The transmitting party 502 is configured to generate a probabilistic filter (e.g. a Bloom filter or a Cuckoo filter). The probabilistic filter encodes either a set of whitelisted data items or a set of blacklisted data items. Here, "set" is used to refer to one or more data items of the same type, i.e. the same category. For instance, the set of data items may be a set of transaction identifiers.

In some examples, the probabilistic filter may encode multiple sets (i.e. multiple different categories) of data items. For instance, a first set of data items may be a set of transaction identifiers and a second set of data items may be a set of tokens. The particular types of data items will be discussed below.

The transmitting party 502 may generate a plurality of probabilistic filters. One, some or all of the plurality of filters may encode multiple sets (i.e. different types) of data items. One, some or all of the plurality of filters may encode a single set (i.e. a single type) of data items.

The transmitting party 502 may update the previously generated probabilistic filter(s) to include additional data items. For instance, the transmitting party 502 may update the filter(s) periodically (e.g. in units of time, or blocks 151), or on-the-fly as new data items become available.

The transmitting party 502 is configured to transmit the probabilistic filter(s) to the receiving party 501 (and to one or more other receiving parties 501). The transmitting party 502 may transmit all of the filters together or separately. The filter(s) may be transmitted periodically, e.g. upon being updated.

In some embodiments, at least one probabilistic filter may encode a set of blockchain addresses. For instance, the addresses may be public keys or public key hashes (i.e. a hash, or double-hash, of a public key). The set of blockchain addresses may be a set of whitelisted addresses. Alternatively, the set of blockchain addresses may be a set of blacklisted addresses.

Additionally or alternatively, at least one probabilistic filter may encode a set of blockchain transaction outputs (UTXOs), or rather respective identifiers of UTXOs. For instance, a respective UTXOs may be identified based on the respective transaction identifier of the transaction containing that UTXO. The respective UTXO may be further identified based on the output index of that UTXO within the respective transaction. As an example, a UTXO may be identified by concatenating the transaction identifier and output index. The set of blockchain transaction outputs may be a set of whitelisted blockchain transaction outputs. Alternatively, the set of blockchain transaction outputs may be a set of blacklisted blockchain transaction outputs.

In some embodiments, at least one probabilistic filter may encode a set of blockchain transaction identifiers (TxIDs). A TxID is generated by applying a hash function to the whole of the transaction. The set of TxIDs may be a set of whitelisted TxIDs. Alternatively, the set of TxIDs may be a set of blacklisted TxIDs.

In additional or alternative embodiments, at least one probabilistic filter may encode a set of block headers. A block header is generated by applying a hash function to the set of transactions within that block. The set of block headers may be a set of whitelisted block headers. Alternatively, the set of block headers may be a set of blacklisted block headers.

Additionally or alternatively, at least one probabilistic filter may encode a set of content items. For instance, the content items may include one or more of: audio content, image content, video content, documents, etc. The set of content items may include only one type of content, or multiple different types of content. It will be appreciated that encoding content items (and data items in general) in the filter means including a representation (e.g. a hash) of the content items, rather than the content items themselves. Some data items (e.g. TxlDs) will already be a hash and therefore need not be hashed again, although that it not excluded. The content items may comprise content included in published blockchain transactions. Additionally or alternatively, the content items may comprise content that has not been included in a published blockchain transaction. The set of content items may be a set of whitelisted content items. Alternatively, the set of content items may be a set of blacklisted content items.

In some embodiments, at least one probabilistic filter may encode a set of tokens or transactions transferring token ownership. For instance, the transmitting party may be a token issuer (or authority) that issues or otherwise controls tokens. A token is a programmable digital asset that is hosted on an existing blockchain, which is different compared to the native digital asset of that blockchain. A token is an entry on the blockchain (e.g. contained in an output of a transaction) that acts as a digital record of ownership of a certain asset, e.g. a ticket, coupon, loyalty points, access card, etc. The set of tokens may be a set of whitelisted tokens. Alternatively, the set of content items may be a set of blacklisted tokens. Due to the presence a natively trusted authority, the token issuer, the blacklisting or whitelisting of tokens is simple to implement since there is only a single authority. The token issuer may maintain and release filters according to custom company rules and guidelines (compared to more rigid filters released by courts etc).

The receiving party 501 is configured to obtain at least one probabilistic filter from the transmitting party 502. In some examples, the receiving party 501 obtains a plurality of probabilistic filters, e.g. from the same transmitting party 502 or from multiple different transmitting parties 502. The receiving party 501 may obtain the filter(s) directly from the transmitting party 501, or otherwise.

The receiving party 501 is also configured to obtain a blockchain transaction. Obtaining the blockchain transaction may comprise obtaining a copy of the blockchain transaction, or a reference to the blockchain transaction, e.g. a transaction identifier (TxID) of that transaction. The obtained blockchain transaction may be a transaction that has been published in a block 151. Alternatively, the blockchain transaction may be a transaction that has yet to be published. For instance, the blockchain transaction may be in the ordered set of pending transactions 154 maintained at a node 104, or the blockchain transaction may be a transaction template, i.e. a transaction that has not yet been submitted to the blockchain network 106. A blockchain template may be incomplete, e.g. missing one or more inputs and/or outputs, and/or missing one or more signatures.

The obtained blockchain transaction is associated with a candidate data item. The candidate data item may be a component of the blockchain transaction. That is, the blockchain transaction may comprise the candidate data item. The candidate data item may be a function of the blockchain transaction. That is, the candidate data item may be generated based on the candidate data item, e.g. the TxID of the transaction. The candidate data item may be referenced by the transaction. For instance, the transaction may comprise a reference to the candidate data item. Examples of candidate data items are given below.

Having obtained one or more probabilistic filters and a blockchain transaction (the order of which does not matter), the receiving party 501 determines whether to process the blockchain transaction based on whether the candidate data item is present in one, some or all of the probabilistic filters. That is, the receiving party 501 performs a membership test of the candidate data item.

If the receiving party 501 operates a blockchain client application 105, processing the blockchain transaction may comprise signing the blockchain transaction with a signature associated with the receiving party 501 (e.g. using a private key owned by the receiving party 501). Additionally or alternatively, processing the blockchain transaction may comprise transmitting the (signed) transaction to one or more third parties 503 or to the blockchain network 106.

If the receiving party 501 operates a blockchain node 104, processing the blockchain transaction may comprise publishing the transaction in a block 151 and/or propagating the transaction to other nodes 104. Or, processing the blockchain transaction may comprise transmitting the transaction to one or more third parties 503, e.g. in response to a request for the transaction. As another option, processing the blockchain transaction may comprise publishing or transmitting some, but not all, of the transaction. For instance, part of the transaction may be pruned (e.g. obfuscated).

The candidate data item may be a blockchain address. A blockchain address corresponds to, i.e. maps to, an output of a transaction. More specifically, the blockchain address maps to the locking script of an output of the transaction. The blockchain address may be, for instance, a public key or a public key hash, e.g. if the output if a pay-to-public-key-hash (P2PKH) output.

The candidate blockchain address may be an address mapped to an output of the obtained blockchain transaction. If the set of whitelisted data items encoded by the obtained probabilistic filter comprises a set of whitelisted blockchain addresses, the receiving party 501 may process the obtained transaction only if the candidate blockchain address is one of the whitelisted addresses. If the set of blacklisted data items encoded by the obtained probabilistic filter comprises a set of blacklisted blockchain addresses, the receiving party 501 may process the obtained transaction only if the candidate blockchain address is not one of the blacklisted addresses. Here, processing the transaction may include e.g. signing the transaction, and/or transmitting the transaction to a third party (e.g. user 103 or node 104), and/or publishing the transaction in a block 151. It will be appreciated that different options for processing the transaction are available depending on the role of the receiving party 501, e.g. whether the receiving party 501 is a user 103 or node 104 (if the receiving party is a node 104). As a particular example, if the receiving party is a blockchain node 104, processing the transaction may comprise prioritising the transaction for inclusion in a block 151, i.e. ahead of one or more other transactions in the ordered set of transactions 154.

The candidate data item may be an unspent transaction output (UTXO). That is, the obtained blockchain transaction may reference a UTXO of a previous transaction (the previous transaction being a published transaction, for example). A UTXO of a previous transaction is typically referenced based on the transaction identifier (TxID) of the previous transaction and an output (or outpoint) index of the output within the set of outputs of the previous transaction.

If the set of whitelisted data items encoded by the obtained probabilistic filter comprises a set of whitelisted UTXOs, the receiving party 501 may process the obtained transaction only if the candidate UTXOs is one of the whitelisted UTXOs. If the set of blacklisted data items encoded by the obtained probabilistic filter comprises a set of blacklisted UTXOs, the receiving party 501 may process the obtained transaction only if the candidate UTXOs is not one of the blacklisted addresses. Here, processing the transaction may include e.g. signing the transaction, and/or transmitting the transaction to a third party (e.g. user 103 or node 104), and/or publishing the transaction in a block 151 (if the receiving party is a node 104). If the receiving party is a blockchain node 104, processing the transaction may comprise prioritising the transaction for inclusion in a block 151, i.e. ahead of one or more other transactions in the ordered set of pending transactions 154.

The candidate data item may be a transaction identifier. That is, the obtained blockchain transaction may comprise a transaction identifier. A transaction identifier (TxID) is generated by inputting the transaction data (i.e. the inputs and outputs) into a hash function. The hash function may be a SHA-256 function, and is sometimes applied twice.

If the set of whitelisted data items encoded by the obtained probabilistic filter comprises a set of transaction identifiers, the receiving party 501 may process the obtained transaction only if the candidate transaction identifier is one of the whitelisted transaction identifiers. If the set of blacklisted data items encoded by the obtained probabilistic filter comprises a set of blacklisted transaction identifiers, the receiving party 501 may process the obtained transaction only if the candidate transaction identifier is not one of the blacklisted transaction identifiers. Processing the obtained transaction may comprise making the transaction available to a third party 503, e.g. transmitting the transaction directly to the third party 503 or otherwise publishing the transaction.

The candidate data item may be a content item. For example, the content item may be an image, audio file, document, video file, text, etc. The content item may be associated with obtained transaction in that the obtained transaction (which may or may not have been published on the blockchain 150) comprises the content item. In other examples, the content item may not yet be included in the transaction but may be suitable for being included in the transaction. In some examples the content item may be a token.

If the set of whitelisted data items encoded by the obtained probabilistic filter comprises a set of content items, the receiving party 501 may process the obtained transaction only if the candidate content item is one of the whitelisted content items. If the set of blacklisted data items encoded by the obtained probabilistic filter comprises a set of blacklisted content items, the receiving party 501 may process the obtained transaction only if the candidate content item is not one of the blacklisted content items. Processing the obtained transaction may comprise making the transaction available to a third party 503, e.g. transmitting the transaction directly to the third party 503 or otherwise publishing the transaction. In some examples, the receiving party 501 may process the transaction even if the content item is blacklisted. In those examples, the receiving party 501 may make the transaction available to a third party 503 without the content item, e.g. by deleting the content item or obfuscating it (e.g. hashing the content item).

Figure 7:
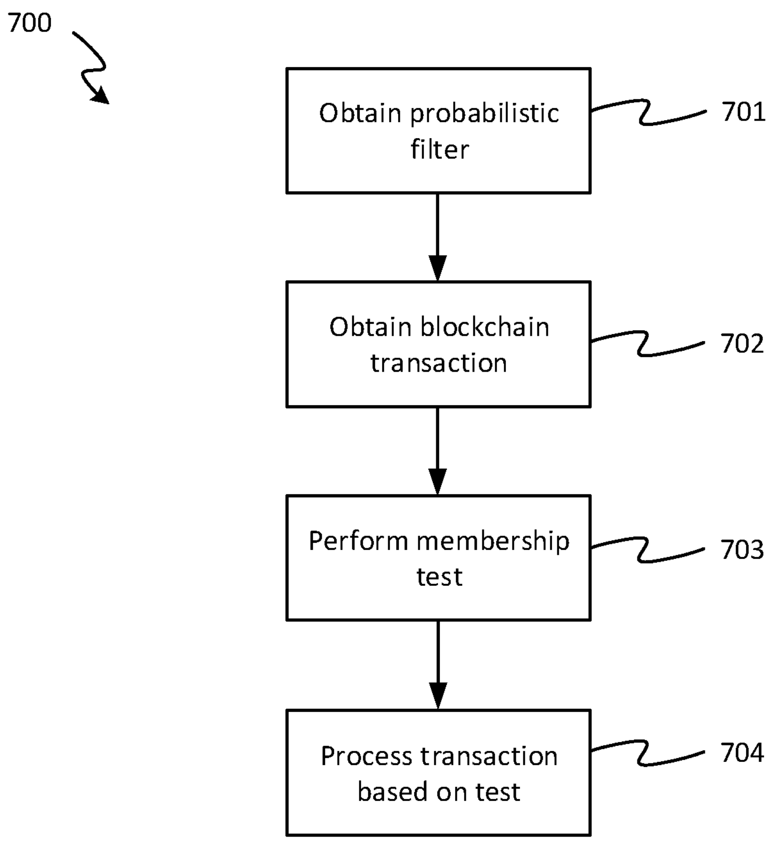
FIG. 7 illustrates an example method according to embodiments of the present invention.

FIG. 7 illustrates an example method 700 implemented by the receiving part 501 according to some embodiments of the present invention. It will be appreciated that some steps of the method 700 are optional, and some steps may not be shown. In step 701, a probability filter is obtained (e.g. received from the transmitting party 502). In step 702, a blockchain transaction is obtained (e.g. received from a user 103). In step 703, a membership test is performed, i.e. to check whether a candidate data item is recorded in the filter. In step 704, the transaction is processed depending on the outcome of the membership test.

Example Use Cases

Safe Wallet Applications

A wallet application (i.e. a blockchain client application) may use the present invention for improved security. Referred to below as a "safe wallet", the wallet application has enriched security to support users and other entities. Safe wallet applications are blockchain application where the assigning of digital asset is protected by preventing transactions to illicit or non-approved wallets. Two main types of Safe Wallets can be designed: Blacklisting Safe Wallets and Whitelisting Safe Wallets. Blacklisting Safe Wallets allow the assigning of digital assets to all the addresses except those inserted in specific lists of banned addresses, called blacklists. Conversely, Whitelisting Safe Wallets allow one to only assign digital assets to lists of preapproved addressed, called whitelists. As the number of addresses included in a blacklist or a whitelist increases, these lists become (due to their size) impractical to be transferred and stored in devices with limited resources (e.g., mobile applications). Moreover, searching in a list is slow from a computational point of view and also exposes the addresses, causing privacy concerns. The present invention overcomes these problems by storing (i.e. representing) addresses in probabilistic filters, which are very efficient structures from both a computational and storage point of view. As probabilistic filters are light and quick to transmit to lightweight nodes, multiple filters (e.g., created by different authorities) can be provided.

Blacklists may be provided and enforced by state authorities. Therefore probabilistic filters may be jurisdiction dependent allowing national courts to comply with internal regulations (e.g., to ban illegal material). Whitelists may instead be created by companies to provide specific services and enhance security (e.g., allow digital assets to only be transferred between company wallets).

Another advantage of the probabilistic filters is that the addresses are not explicitly stored and transmitted (only the transmitting party 502 that creates the filter knows them). This aspect is beneficial when privacy is a concern. For example, an authority could be interested in blocking illicit funds without explicitly disclosing the amount of funds or the precise addresses.

Depending of the specific application (e.g., privacy vs accuracy, need to remove elements), a Bloom filter or a Cuckoo filter can be implemented in a Safe Wallet.

Figure 6A:
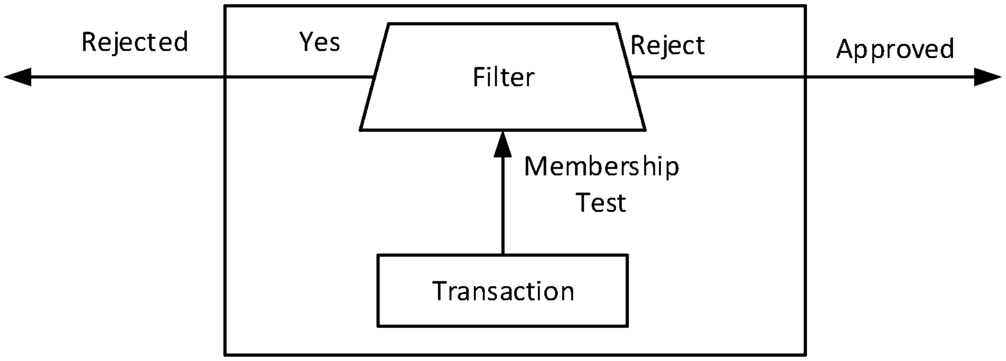

Blacklisting Safe Wallets can be used to ban addresses associated with fraud, illegal content or criminal activities. A trusted authority 502 can create a probabilistic filter recording all the blacklisted addresses. The filter is then transmitted to all the secure wallet applications 501. These wallet applications then test the addresses before signing transactions: if an address is blacklisted the transaction is not signed and the transfer is rejected. This is represented schematically in FIG. 6*a*.

Since false negatives are never possible with probabilistic filters, if an element is not in the filter then it can always be considered safe. On the other hand, elements that match the filter may need to be double checked to exclude a false positive. This means that wallet applications that implement a probabilistic blacklist may require a quick check (e.g. using the filter) for all the outcoming transactions. A very small percentage of transactions would require a further slower check (e.g., by querying an authority database) to detect if an address is actually blacklisted or if it is a false positive.

Figure 6B:
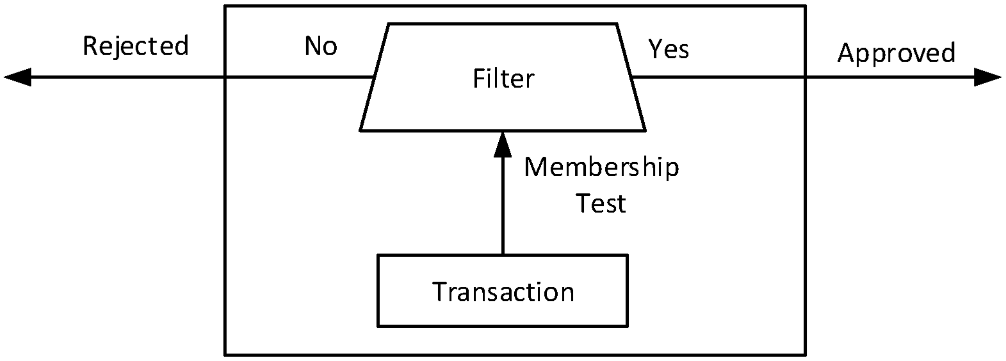

Whitelisting Secure Wallets may be used when a wallet application should sign only transactions assigning digital assets to pre-approved addresses. An example of a possible application of whitelists is for business wallet applications that could be allowed to send digital assets only to providers or other company wallet applications. This prevents frauds and typing errors. In a similar way, a gaming wallet application may set up a whitelisting filter to send transactions only to addresses related to the same game. A whitelisting filter can be created recording all the addresses required for a specific service or application. The transaction is completed only if the membership test is positive. This is represented schematically in FIG. 6*b*.

Since probabilistic filters have false positives, in rare circumstances an address not inserted in the whitelist might pass the membership test. However, the probability of generating an address accidentally (e.g., a typo in the address) or intentionally (e.g., for a fraud) that passes the membership test is close to 0.

Safe Blockchain Nodes

The present invention may also be used by nodes 104. An effective way of prevent fraud and seizing illegal funds would be to prevent associated digital assets from being assigned to other users. Blacklisting Safe Nodes are nodes 104 that implement blacklisting techniques. Like Blacklisting Safe Wallets, they implement probabilistic filters to ban transactions associated with specific addresses. The filters may be applied to incoming transactions: when a node 104 receives transactions in a blacklist, these transactions are marked as invalid and not processed. If most of the nodes 104 agree on a backlist and consider transactions coming from those wallets as invalid, the remaining nodes 104 are forced to discard these transactions if they want their new blocks 151 to be accepted by the majority of the network 106. In order to prevent censorships, blacklist filters should preferably be provided by national or international authorities and approved by courts.

Whitelisting Safe Nodes may be used to filter all the incoming transactions, accepting only the ones coming from known addresses. Whitelisting incoming transactions can be useful when a node wants to prioritise or propagate only transactions received from specific wallet applications. As an example, a node 104 could decide to sell premium services (e.g., prioritized confirmation of transactions, zero-fee transactions, etc.). Gaming and betting applications, which are time-sensitive, could also set up nodes 104 that receive and serve information only to their customers. In contrast to Blacklisting Safe Nodes, Whitelisting Safe Nodes may not necessarily invalidate transactions that are not in the whitelist. Instead, these transactions may be accepted when they are published in a new block by other nodes 104. Whitelisting Safe Nodes may simply refuse to not keep transactions that are not whitelisted in their ordered set of unpublished transactions 154 because these transactions are not applicable for their business model.

Blacklisting Transactions and Transaction Content

Filtering addresses may be implemented at both wallet application level and at node level. However, it is not only the address that may be the reason why a transaction should be banned or allowed. Instead, there are scenarios where specific transactions may contain illicit content and the ban should be applied only to those specific transactions or the specific content included within them. For example, an address might have been linked to a transaction with illicit content, and in that case only that specific transaction should be banned, but not all the previous (licit) transactions linked to that address. This may be the case for addresses used to create several transactions (e.g., a list of documents, or photos). If the private key of one of these addresses is stolen and used to create illicit transactions, only those transactions should be banned, while the older content should remain valid and available on-chain (thus an address ban would not be effective or fair). In other cases, specific content may be blocked regardless of the address or the transaction that contains it (many users could try to submit the same illegal content to bypass an address or transaction specific filter).

In order to ban transactions with specific content within, the transaction IDs may be recorded in a probabilistic filter, in the same way as the addresses. As the transaction ID or the entire transaction are hashed before being recorded in a probabilistic filter (and the hashes have the same format as the one used to record addresses), the probabilistic filter used to record the transactions may be the same used to blacklist addresses or a different one. With this technique, not only addresses, but also specific transactions can be banned. This technique can be used both at the node level (e.g., to globally ban illegal content) or at the wallet application level (e.g., to ban specific content in business environments).

An alternative way to ban on-chain illicit content is to record in a probabilistic filter the objectionable transaction content (instead of the transaction ID). For example, everything after an OP_RETURN instruction may be recorded. All the content included in a problematic transaction after the OP_RETURN can be hashed and inserted in a probabilistic filter. Any other transaction which includes the same content can be easily detected and rejected (if one tries to submit a new transaction with the same content) or served without the content after the OP_RETURN (if the transaction is already published in a block). Another advantage of this technique is that it allows the detection of illegal material without explicitly storing that material (the authorities can keep a record of the material and transmit only the probabilistic filter to the nodes 104 and wallet applications 105). Moreover, probabilistic filters could be preventively created including problematic content identified by public authorities and not yet published on the blockchain 150, allowing preventive control of the content before it is published in a block (e.g., material subjected to copyright could be recorded in a filter to prevent unauthorised uploading to the blockchain 150). In order to prevent naïve workarounds, e.g. changing only one bit in the content (this would generate a completely different hash that is not recorded in the probabilistic filter), different predefined parts of the OP_RETURN can be hashed and recorded. For example, a basic technique could be to split the content in chucks, hash each chunk and record those hashes it in the filter. All the content after the OP_RETURN of the transactions could be tested chunk by chunk and, if one of them is positive, the transaction is rejected or served (e.g. published) without OP_RETURN content. Furthermore, the scalability of this technique may be tailored to the adversary's attempts to upload illicit content. That is, if the blacklisting and checking is as efficient as the adversary generating illicit content transactions, then this may enough to deter the adversary. Moreover, adding new content to a filter is free, whilst creating new transactions has a cost. This should also disincentivise the attacker.

Probabilistic Filter Analysis and Examples

Building a Probabilistic Filter

The following example describe how to create a Bloom filter to blacklist three addresses. The filter will have false positive probability of 10% (this example uses, without losing generality, a high false positive probability to reduce the number of hash functions and simplify the example).

Data:

Type: Bloom filter

Number of elements n=3 ffp=10%

$$\text{Filter size } m = 1.44 * \log_2 \frac{1}{fpp} * \text{num\_of\_elements} = 15 \text{ bit}$$

Number of hash functions $k=\log_2(\text{fpp})=3$

As hashing functions, sha256, double-sha256 and triple-sha256 are used, where the double-sha256 of an element x is sha256 (sha256(x)) and the triple-sha256 is sha256 (sha256 (sha256(x))).

3 addresses:

Addr1=1CjMGY8MywB9W6FESTdeYpN56L4NZQVzC7

Addr2=1CD1Hs9DBNgJLBVaTSKNFkuSmoqzEMM3BE

Addr3=1BoikkFDhYMTsnSGFfxDkFaVgs4dV4ZqRQ

Process:

1. Initialize a new Bloom filter as an array of 0s with length m:

| | | | | | | | | | | | | | | |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 |

2. Insert Addr1:
   sha256(Addr1) modulo m=13
   double-sha256(Addr1) modulo m=8
   triple-sha256(Addr1) modulo m=13

| | | | | | | | | | | | | | | |
|---|---|---|---|---|---|---|---|---|---|---|---|---|---|---|
| 0 | 0 | 0 | 0 | 0 | 0 | 0 | 0 | 1 | 0 | 0 | 0 | 0 | 1 | 0 |

3. Insert Addr2:
   sha256(Addr2) modulo m=0
   double-sha256(Addr2) modulo m=6
   triple-sha256(Addr2) modulo m=3

| | | | | | | | | | | | | | | |
|---|---|---|---|---|---|---|---|---|---|---|---|---|---|---|
| 1 | 0 | 0 | 1 | 0 | 0 | 1 | 0 | 1 | 0 | 0 | 0 | 0 | 1 | 0 |

4. Insert Addr3:
   sha256(Addr3) modulo m=3
   double-sha256(Addr3) modulo m=10
   triple-sha256(Addr3) modulo m=2

| | | | | | | | | | | | | | | |
|---|---|---|---|---|---|---|---|---|---|---|---|---|---|---|
| 1 | 0 | 1 | 1 | 0 | 0 | 1 | 0 | 1 | 0 | 1 | 0 | 0 | 1 | 0 |

This is the final 15-bit filter that can be transmitted to the light wallet applications.

Look-Up of an Address:

Addr3=1BoikkFDhYMTsnSGFfxDkFaVgs4dV4ZqRQ
   sha256(Addr3) modulo m=3
   double-sha256(Addr3) modulo m=10
   triple-sha256(Addr3) modulo m=2

| | | | | | | | | | | | | | | |
|---|---|---|---|---|---|---|---|---|---|---|---|---|---|---|
| 1 | 0 | 1 | 1 | 0 | 0 | 1 | 0 | 1 | 0 | 1 | 0 | 0 | 1 | 0 |

All the hash functions correspond to cells set to 1 in the filter, therefore the element is recorded in the filter. If this is a blacklisting filter the transaction associated with Addr3 is rejected, if it is a whitelisting filter the transaction is approved.

Addr4=1JXiyVNRx37YQgSFt13XqaU7r2R1ThNLhx
   sha256(Addr3) modulo m=9
   double-sha256(Addr3) modulo m=13
   C triple-sha256(Addr3) modulo m=10

| | | | | | | | | | | | | | | |
|---|---|---|---|---|---|---|---|---|---|---|---|---|---|---|
| 1 | 0 | 1 | 1 | 0 | 0 | 1 | 0 | 1 | 0 | 1 | 0 | 0 | 1 | 0 |

At least one of the hash functions correspond to cell set to 0 in the filter (i.e., cell 9 in the example), therefore the element is not recorded in the filter. If this is a blacklisting filter the transaction associated with Addr4 is accepted, if it is a whitelisting filter the transaction is rejected.

Filter Size and Scalability

The following section analyses how the probabilistic filter size grows with the number of elements to be inserted. The size of the filters is computed as follows:

$$\text{Bloom filter size (in bit)} = 1.44 * \log_2 \frac{1}{fpp} * \text{number of elements}$$

$$\text{Cuckoo filter size (in bit)} = \frac{\log_2 \frac{1}{fpp} + 2}{\text{load}} * \text{number of elements}$$

The size of the filters depends only on the false positive probability (fpp), the load (only the Cuckoo filer) and the number of elements to be inserted. Probabilistic filters do not depend on the size of the inputs because these filters only store the input hashes (which have constant size).

The filter size is compared with a list of addresses storing the same number of elements. The size of a blockchain address according to some blockchains is 25 bytes and made up of the following components:

<version_byte><20 bytes of RIPEMD-160 (SHA-256 (PublicKey))><4 bytes checksum>

The following parameters are assumed:

False positive probability (fpp)=0.1%

Filter load (Cuckoo filter only)=95%

| Addresses | List Size | Bloom Filter Size | Cuckoo Filter Size |
|---|---|---|---|
| 100 | 2.5 KB | 0.17 KB | 0.15 KB |
| 1.000 | 25 KB | 1.7 KB | 1.5 KB |
| 10.000 | 250 KB | 17 KB | 15 KB |
| 100.000 | 2.5 MB | 170 KB | 150 KB |
| 1.000.000 | 25 MB | 1.7 MB | 1.5 MB |
| 10.000.000 | 250 MB | 17 MB | 15 MB |
| 100.000.000 | 2.5 GB | 170 MB | 150 MB |

Compression ratio compared to a list of addresses:
Bloom filter=93.2%
Cuckoo filter=94.0%

The above table shows the size of a list, a Bloom filter and a Cuckoo filter that store a given amount of addresses. As the number of addresses to be stored increases, the list of addresses starts to suffer from scalability issues, especially for light applications (in an extreme case, they would need to receive and store 2.5 GB of data in order to blacklist 100 million of addresses). Storing transaction IDs or transaction content (e.g. everything after OP_RETURN) would require even more space, making the usage of probabilistic filters even more convenient. If compared to a list of transaction IDs (32 bytes each) the Bloom filters have a 94.7% compression rate and the Bloom filters a 95.4% compression rate. The compression rate is even more significant if compared to lists of transaction content (e.g., images) that should be banned. For example, considering small images that could be stored on-chain (e.g., 50 KB each), a Bloom filter would record them with a compression ratio of 99.997%, meaning that it would be possible to ban 1000 images (50 MB) by transferring to a light wallet only a 1.5 KB filter.

Nodes 104 may suffer less burden when having to handle the size of the examples lists. However, as lists are slow for look-ups and do not preserve the privacy (all the addresses or content would be explicitly listed). Therefore a system for quick membership testing is also useful for nodes 104. A possible implementation on a node 104 could include keeping a probabilistic filter in memory (e.g. RAM) for quick tests, and a list for verification of possible false positives to be stored on a drive (or a query to an authority database when privacy is a concern).

Other variants or use cases of the disclosed techniques may become apparent to the person skilled in the art once given the disclosure herein. The scope of the disclosure is not limited by the described embodiments but only by the accompanying claims.

For instance, some embodiments above have been described in terms of a bitcoin network 106, bitcoin blockchain 150 and bitcoin nodes 104. However it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all of the described properties of the bitcoin blockchain 150, bitcoin network 106 and bitcoin nodes 104 as described above.

In preferred embodiments of the invention, the blockchain network 106 is the bitcoin network and bitcoin nodes 104 perform at least all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 106).

In non-preferred embodiments of the invention, the blockchain network 106 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

It will be appreciated that the above embodiments have been described by way of example only. More generally there may be provided a method, apparatus or program in accordance with any one or more of the following Statements.

Statement 1. A computer-implemented method of processing a blockchain transaction, wherein the method is performed by a receiving party and comprises:

obtaining one or more probabilistic filters, wherein each probabilistic filter encodes one of i) one or more sets of whitelisted data items, or ii) one or more sets of blacklisted data items;

obtaining a blockchain transaction, wherein the obtained blockchain transaction is associated with a candidate data item corresponding to i) one of the one or more sets of whitelisted data items, or ii) one on the one or more sets of blacklisted data items; and determining whether to process the obtained blockchain transaction based on whether the candidate data item is present in at least one of the one or more probabilistic filters.

Statement 2. The method of statement 1, wherein one of the one or more sets of whitelisted data items comprises a set of whitelisted blockchain addresses, wherein one of the one or more sets of blacklisted data items comprises a set of blacklisted blockchain addresses, and wherein the candidate data item is a candidate blockchain address.

For instance, the candidate blockchain address may be a destination address corresponding to an output of the obtained blockchain transaction. Alternatively, the candidate blockchain address may be an address associated with an output attempting to be spent by an input of the obtained blockchain transaction.

Statement 3. The method of statement 2, wherein determining whether to process the obtained blockchain transaction comprises determining whether to sign the obtained blockchain transaction with a digital signature associated with the receiving party.

Statement 4. The method of statement 3, wherein:

i) at least one probabilistic filter encodes the set of whitelisted blockchain addresses, and wherein the method comprises signing the obtained blockchain transaction on condition that the candidate blockchain address is present in the at least one probabilistic filter; or ii) at least one the probabilistic filter encodes the set of blacklisted blockchain addresses, and wherein the method comprises signing the obtained blockchain transaction on condition that the candidate blockchain address is not present in the at least one probabilistic filter.

That is, the receiving party may be a user that receives a request to sign the obtained blockchain transaction with a digital signature associated with the user.

Preferably, the obtained blockchain transaction is only signed if the candidate address is not present in each and every one of the filters.

Statement 5. The method of statement 2, wherein determining whether to process the obtained blockchain transaction comprises determining whether to accept the obtained blockchain transaction for publishing in a block of the blockchain.

That is, the receiving party may be a blockchain node that receives a request to publish the obtained blockchain transaction in a new block of the blockchain.

Statement 6. The method of statement 5, wherein:

i) at least one probabilistic filter encodes the set of whitelisted blockchain addresses, and wherein the method comprises accepting the obtained blockchain transaction on condition that the candidate blockchain address is present in the at least one probabilistic filter; or ii) at least one probabilistic filter encodes ii) the set of blacklisted blockchain addresses, and wherein the method comprises accepting the obtained blockchain transaction on condition that the candidate blockchain address is not present in the at least one probabilistic filter.

Preferably, the obtained blockchain transaction is only accepted if the candidate address is not present in each and every one of the filters.

Statement 7. The method of statement 6, wherein accepting the obtained blockchain comprises prioritising the obtained blockchain transaction over one or more other blockchain transactions for publishing in a block of the blockchain.

Statement 8 The method of statement 2, wherein obtaining the blockchain transaction comprises obtaining a block comprising the blockchain transaction, and wherein determining whether to process the obtained blockchain transaction comprises determining whether to validate the block comprising the obtained blockchain transaction.

That is, the receiving party may be a blockchain node that is in the process of validating a published block, e.g. a block published by a different blockchain node, e.g. a node that does not process transactions using the filters. The receiving party may accept or reject the obtained block depending on the outcome of the membership test.

Statement 9. The method of statement 8, wherein:

i) at least one probabilistic filter encodes the set of whitelisted blockchain addresses, and wherein the method comprises validating the obtained block on condition that the candidate blockchain address is present in the at least one probabilistic filter; or ii) at least one probabilistic filter encodes ii) the set of blacklisted blockchain addresses, and wherein the method comprises validating the obtained block on condition that the candidate blockchain address is not present in the at least one probabilistic filter.

Statement 10. The method of any preceding statement, wherein one of the one or more sets of whitelisted data items comprises a set of whitelisted unspent transaction outputs, and wherein the one or more sets of blacklisted data items comprises a set of blacklisted unspent transaction outputs, and wherein the candidate data item is a candidate unspent transaction output referenced by the obtained blockchain transaction.

That is, the candidate unspent transaction output is an output of a previous blockchain transaction referenced by an input of the obtained blockchain transaction.

Statement 11. The method of statement 10, wherein determining whether to process the obtained blockchain transaction comprises determining whether to sign the transaction or accept the referenced blockchain transaction for publishing in a block of the blockchain.

For instance, a user may sign the transaction, or a node may accept the transaction.

Statement 12. The method of statement 11, wherein:

i) at least one probabilistic filter encodes the set of whitelisted unspent transaction outputs, and wherein the method comprises signing or accepting the obtained blockchain transaction on condition that the candidate unspent blockchain transaction is present in the at least one probabilistic filter; or ii) at least one probabilistic filter encodes the set of blacklisted unspent transaction outputs, and wherein the method comprises signing or accepting the obtained blockchain transaction on condition that the candidate blockchain unspent transaction output is not present in the at least one probabilistic filter.

Statement 13. The method of any preceding statement, wherein the one or more sets of whitelisted data items comprises a set of whitelisted blockchain transaction identifiers, and wherein the one or more sets of blacklisted data items comprises a set of blacklisted blockchain transaction identifiers, and wherein the candidate data item is a candidate transaction identifier of the obtained blockchain transaction.

Statement 14. The method of statement 13, wherein determining whether to process the obtained blockchain transaction comprises determining whether to transmit the obtained blockchain transaction to a third party.

For instance, the third party may have requested access to the obtained transaction.

Statement 15. The method of statement 14, wherein:

i) at least one probabilistic filter encodes the set of whitelisted blockchain transaction identifiers, and wherein the method comprises transmitting the obtained blockchain transaction to the third party on condition that the candidate blockchain transaction identifier is present in the at least one probabilistic filter; or ii) at least one probabilistic filter encodes the set of blacklisted blockchain transaction identifiers, and wherein the method comprises transmitting the obtained blockchain transaction to the third party on condition that the candidate blockchain transaction identifier is not present in the at least one probabilistic filter.

Statement 16. The method of any preceding statement, wherein the one or more sets of whitelisted data items comprises a set of whitelisted transaction content, and wherein the one or more sets of blacklisted data items comprises a set of blacklisted transaction content, and wherein the candidate data item is a candidate transaction content item of the obtained blockchain transaction.

For instance, the transaction content may be some or all of an output of a transaction, e.g. an OP_RETURN output. The transaction content may comprise one or more of: an image file, audio file, video file, etc.

Statement 17. The method of statement 16, wherein determining whether to process the obtained blockchain transaction comprises determining whether to transmit the obtained blockchain transaction to a third party.

Statement 18. The method of statement 17, wherein:

i) at least one probabilistic filter encodes the set of whitelisted blockchain transaction content, and wherein the method comprises transmitting the obtained blockchain transaction to the third party on condition that the candidate blockchain transaction content item is present in the at least one probabilistic filter; or ii) at least one probabilistic filter encodes the set of blacklisted blockchain transaction identifiers, and wherein the method comprises transmitting the obtained blockchain transaction to the third party on condition that the candidate blockchain transaction identifier is not present in the at least one probabilistic filter.

Statement 19. The method of statement 16, wherein determining whether to process the obtained blockchain transaction comprises determining whether to accept the obtained blockchain transaction for publishing in a block of the blockchain.

Statement 20. The method of statement 19, wherein:

i) at least one probabilistic filter encodes the set of whitelisted blockchain transaction content, and wherein the method comprises accepting the obtained blockchain transaction on condition that the candidate blockchain transaction content item is present in the at least one probabilistic filter; or ii) at least one probabilistic filter encodes the set of blacklisted blockchain transaction identifiers, and wherein the method comprises accepting the obtained blockchain transaction to the third party on condition that the candidate blockchain transaction identifier is not present in the at least one probabilistic filter.

Statement 21. The method of statement 16 or any statement dependent thereon, wherein the set of whitelisted transaction content item comprises a set of whitelisted tokens, and wherein the set of blacklisted transaction content item comprises a set of blacklisted tokens, and wherein the candidate data item is a candidate token.

Statement 22. A computer-implemented method of controlling access to some or all of a blockchain transaction, wherein the method is performed by a transmitting party and comprises:

generating one or more probabilistic filters, wherein each probabilistic filter encodes one of i) one or more sets of whitelisted data items, or ii) one or more sets of blacklisted data items; and transmitting the one or more probabilistic filters to a receiving party.

Statement 23. The method of statement 22, wherein the one or more sets of whitelisted data items comprises one, some or all of:

a set of whitelisted blockchain addresses, a set of whitelisted unspent transaction outputs, a set of whitelisted blockchain transaction identifiers, a set of whitelisted transaction content items, and a set of whitelisted tokens.

Statement 24. The method of statement 22 or statement 23, wherein the one or more sets of blacklisted data items comprises one, some or all of:

a set of blacklisted blockchain addresses,
a set of blacklisted unspent transaction outputs,
a set of blacklisted blockchain transaction identifiers,
a set of blacklisted transaction content items, and
a set of blacklisted tokens.

Statement 25. The method of any of statements 22 to 24, wherein the transmitting party is a first blockchain node.

Statement 26. The method of any of statements 22 to 24, wherein the transmitting party is a trusted authority.

For instance, the trusted authority may be a legal authority, or a token authority.

Statement 27. The method of any of statements 22 to 26, wherein the receiving party is a second blockchain node.

Statement 28. Computer equipment comprising:

memory comprising one or more memory units; and
processing apparatus comprising one or more processing units, wherein the memory stores code arranged to run on the processing apparatus, the code being configured so as when on the processing apparatus to perform the method of any of statements 1 to 27.

Statement 29. A computer program embodied on computer-readable storage and configured so as, when run on computer equipment of statement 28, to perform the method of any of statements 1 to 27.

According to another aspect disclosed herein, there may be provided a method comprising the actions of the transmitting entity and the receiving entity.

According to another aspect disclosed herein, there may be provided a system comprising the computer equipment of the transmitting entity and the receiving entity.

The invention claimed is:

1. A computer-implemented method of processing a blockchain transaction, wherein the method is performed by a receiving party and comprises:

obtaining one or more probabilistic filters, wherein each respective probabilistic filter is a probabilistic data structure that is used to test whether an element is a member of a respective set of data items, the respective set of data items encoded and stored in the probabilistic data structure, the encoding including compression, each respective set including one of i) one or more sets of whitelisted data items, or ii) one or more sets of blacklisted data items;

obtaining the blockchain transaction, wherein the obtained blockchain transaction is associated with a candidate data item corresponding to i) one of the one or more sets of whitelisted data items, or ii) one of the one or more sets of blacklisted data items; and determining whether the candidate data item is a member of i) one of the one or more sets of whitelisted data items, or ii) one of the one or more sets of blacklisted data items based on whether the candidate data item is present in the probabilistic data structure; and determining whether to process the obtained blockchain transaction based on whether the candidate data item is a member of i) one of the one or more sets of whitelisted data items, or ii) one of the one or more sets of blacklisted data items.

2. The method of claim 1, wherein one of the one or more sets of whitelisted data items comprises a set of whitelisted blockchain addresses, wherein one of the one or more sets of blacklisted data items comprises a set of blacklisted blockchain addresses, and wherein the candidate data item is a candidate blockchain address.

3. The method of claim 2, wherein determining whether to process the obtained blockchain transaction comprises determining whether to sign the obtained blockchain transaction with a digital signature associated with the receiving party.

4. The method of claim 3, wherein:

i) at least one probabilistic filter encodes the set of whitelisted blockchain addresses, and wherein the method comprises signing the obtained blockchain transaction on condition that the candidate blockchain address is present in the at least one probabilistic filter; or ii) at least one the probabilistic filter encodes the set of blacklisted blockchain addresses, and wherein the method comprises signing the obtained blockchain transaction on condition that the candidate blockchain address is not present in the at least one probabilistic filter.

5. The method of claim 2, wherein determining whether to process the obtained blockchain transaction comprises determining whether to accept the obtained blockchain transaction for publishing in a block of the blockchain.

6. The method of claim 5, wherein:

i) at least one probabilistic filter encodes the set of whitelisted blockchain addresses, and wherein the method comprises accepting the obtained blockchain transaction on condition that the candidate blockchain address is present in the at least one probabilistic filter; or ii) at least one probabilistic filter encodes ii) the set of blacklisted blockchain addresses, and wherein the method comprises accepting the obtained blockchain transaction on condition that the candidate blockchain address is not present in the at least one probabilistic filter.

7. The method of claim 2, wherein obtaining the blockchain transaction comprises obtaining a block comprising the blockchain transaction, and wherein determining whether to process the obtained blockchain transaction comprises determining whether to validate the block comprising the obtained blockchain transaction.

8. The method of claim 7, wherein:

i) at least one probabilistic filter encodes the set of whitelisted blockchain addresses, and wherein the method comprises validating the obtained block on condition that the candidate blockchain address is present in the at least one probabilistic filter; or ii) at least one probabilistic filter encodes ii) the set of blacklisted blockchain addresses, and wherein the method comprises validating the obtained block on condition that the candidate blockchain address is not present in the at least one probabilistic filter.

9. The method of claim 1, wherein one of the one or more sets of whitelisted data items comprises a set of whitelisted unspent transaction outputs, and wherein the one or more sets of blacklisted data items comprises a set of blacklisted unspent transaction outputs, and wherein the candidate data item is a candidate unspent transaction output referenced by the obtained blockchain transaction.

10. The method of claim 9, wherein determining whether to process the obtained blockchain transaction comprises determining whether to sign the transaction or accept the referenced blockchain transaction for publishing in a block of the blockchain.

11. The method of claim 10, wherein:

i) a first at least one probabilistic filter encodes the set of whitelisted unspent transaction outputs, and wherein the method comprises signing or accepting the obtained blockchain transaction on condition that the candidate unspent blockchain transaction is present in the at least one probabilistic filter; or ii) a second at least one probabilistic filter encodes the set of blacklisted unspent transaction outputs, and wherein the method comprises signing or accepting the obtained blockchain transaction on condition that the candidate blockchain unspent transaction output is not present in the at least one probabilistic filter.

12. The method of claim 1, wherein the one or more sets of whitelisted data items comprises a set of whitelisted blockchain transaction identifiers, and wherein the one or more sets of blacklisted data items comprises a set of blacklisted blockchain transaction identifiers, and wherein the candidate data item is a candidate transaction identifier of the obtained blockchain transaction.

13. The method of claim 12, wherein determining whether to process the obtained blockchain transaction comprises determining whether to transmit the obtained blockchain transaction to a third party, and wherein:

i) a first at least one probabilistic filter encodes the set of whitelisted blockchain transaction identifiers, and wherein the method comprises transmitting the obtained blockchain transaction to the third party on condition that the candidate blockchain transaction identifier is present in the at least one probabilistic filter; or ii) a second at least one probabilistic filter encodes the set of blacklisted blockchain transaction identifiers, and wherein the method comprises transmitting the obtained blockchain transaction to the third party on condition that the candidate blockchain transaction identifier is not present in the at least one probabilistic filter.

14. The method of claim 1, wherein the one or more sets of whitelisted data items comprises a set of whitelisted transaction content, and wherein the one or more sets of blacklisted data items comprises a set of blacklisted transaction content, and wherein the candidate data item is a candidate transaction content item of the obtained blockchain transaction.

15. The method of claim 14, wherein determining whether to process the obtained blockchain transaction comprises determining whether to transmit the obtained blockchain transaction to a third party, and wherein:

i) a first at least one probabilistic filter encodes the set of whitelisted blockchain transaction content, and wherein the method comprises transmitting the obtained blockchain transaction to the third party on condition that the candidate blockchain transaction content item is present in the at least one probabilistic filter; or ii) a second at least one probabilistic filter encodes the set of blacklisted blockchain transaction content, and wherein the method comprises transmitting the obtained blockchain transaction to the third party on condition that the candidate blockchain transaction content item is not present in the at least one probabilistic filter.

16. The method of claim 14, wherein determining whether to process the obtained blockchain transaction comprises determining whether to accept the obtained blockchain transaction for publishing in a block of the blockchain.

17. The method of claim 16, wherein:

i) at least one probabilistic filter encodes the set of whitelisted blockchain transaction content, and wherein the method comprises accepting the obtained blockchain transaction on condition that the candidate blockchain transaction content item is present in the at least one probabilistic filter; or ii) at least one probabilistic filter encodes the set of blacklisted blockchain transaction content, and wherein the method comprises accepting the obtained blockchain transaction to a third party on condition that the candidate blockchain transaction content item is not present in the at least one probabilistic filter.

18. The method of claim 1, wherein the probabilistic filter is a Bloom filter or a Cuckoo filter.

19. Computer equipment comprising:

memory comprising one or more memory units; and processing apparatus comprising one or more processing units, wherein the memory stores code arranged to run on the processing apparatus, the code being configured so as when run on the processing apparatus, the processing apparatus performs a method of processing a blockchain transaction, wherein the method is performed by a receiving party and comprises:

obtaining one or more probabilistic filters, wherein each respective probabilistic filter is a probabilistic data structure that is used to test whether an element is a member of a respective set of data items, the respective set of data items encoded and stored in the probabilistic data structure, the encoding including compression, each respective set including one of i) one or more sets of whitelisted data items, or ii) one or more sets of blacklisted data items;

obtaining the blockchain transaction, wherein the obtained blockchain transaction is associated with a candidate data item corresponding to i) one of the one or more sets of whitelisted data items, or ii) one of the one or more sets of blacklisted data items; and determining whether the candidate data item is a member of i) one of the one or more sets of whitelisted data items, or ii) one of the one or more sets of blacklisted data items based on whether the candidate data item is present in the probabilistic data structure; and determining whether to process the obtained blockchain transaction based on whether the candidate data item is a member of i) one of the one or more sets of whitelisted data items, or ii) one of the one or more sets of blacklisted data items.

20. A computer program embodied on a non-transitory computer-readable storage medium and configured so as, when run on computer equipment, the computer equipment performs a method of processing a blockchain transaction, wherein the method is performed by a receiving party and comprises:

obtaining one or more probabilistic filters, wherein each respective probabilistic filter is a probabilistic data structure that is used to test whether an element is a member of a respective set of data items, the respective set of data items encoded and stored in the probabilistic data structure, the encoding including compression, each respective set encodes-including one of i) one or more sets of whitelisted data items, or ii) one or more sets of blacklisted data items;

obtaining the blockchain transaction, wherein the obtained blockchain transaction is associated with a candidate data item corresponding to i) one of the one or more sets of whitelisted data items, or ii) one of the one or more sets of blacklisted data items; and determining whether the candidate data item is a member of i) one of the one or more sets of whitelisted data items, or ii) one of the one or more sets of blacklisted data items based on whether the candidate data item is present in the probabilistic data structure; and determining whether to process the obtained blockchain transaction based on whether the candidate data item is a member of i) one of the one or more sets of whitelisted data items, or ii) one of the one or more sets of blacklisted data items.

* * * * *